United States Patent
Hedman et al.

(10) Patent No.: US 9,723,030 B2
(45) Date of Patent: Aug. 1, 2017

(54) METHOD AND DEVICE FOR INDICATING VOLTE CAPABILITY

(75) Inventors: Peter Hedman, Helsingborg (SE); Håkan Palm, Växjö (SE); Gunnar Rydnell, Västra Frölunda (SE); Magnus Stattin, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/263,829

(22) PCT Filed: Oct. 4, 2011

(86) PCT No.: PCT/EP2011/067273
§ 371 (c)(1),
(2), (4) Date: Oct. 10, 2011

(87) PCT Pub. No.: WO2013/050061
PCT Pub. Date: Apr. 11, 2013

(65) Prior Publication Data
US 2014/0204901 A1    Jul. 24, 2014

(51) Int. Cl.
*H04L 29/06* (2006.01)
*H04W 36/00* (2009.01)
*H04W 88/06* (2009.01)

(52) U.S. Cl.
CPC ..... *H04L 65/1069* (2013.01); *H04W 36/0011* (2013.01); *H04W 36/0022* (2013.01); *H04W 88/06* (2013.01)

(58) Field of Classification Search
CPC .............................. H04W 36/22; H04W 88/06
USPC ................................................... 370/331, 338
See application file for complete search history.

(56) References Cited

U.S. PATENT DOCUMENTS

| | | | |
|---|---|---|---|
| 2009/0238143 A1* | 9/2009 | Mukherjee | H04W 36/0022 370/331 |
| 2010/0041384 A1* | 2/2010 | Kazmi | 455/419 |
| 2010/0135246 A1* | 6/2010 | Hallental | 370/331 |

(Continued)

FOREIGN PATENT DOCUMENTS

CN          101431747 A    5/2009

OTHER PUBLICATIONS

International Search Report for PCT/EP2011/067273 mailed Jul. 10, 2012, 14 pages.

(Continued)

*Primary Examiner* — Hassan Kizou
*Assistant Examiner* — Hector Reyes Ortiz
(74) *Attorney, Agent, or Firm* — Withrow & Terranova, PLLC

(57) ABSTRACT

A method (100) for use in a Mobility Management Entity, an MME, in an LTE system, comprising (110) obtaining and determining the capability of a mobile terminal in the LTE system regarding the mobile terminal's capability for handover over from the LTE system to a 2G and/or a 3G system, comparing (115) the mobile terminal's capability and the LTE system's capability for Single Radio Voice Channel Continuity, SRVCC, handover over from the LTE system to a 2G and/or a 3G system, and, depending on the outcome of the comparison, instructing (120, 125) the mobile terminal to use Voice over LTE, VoLTE, or Circuit Switched, CS, fallback when initiating voice sessions.

12 Claims, 3 Drawing Sheets

(56) References Cited

U.S. PATENT DOCUMENTS

2010/0142488 A1* 6/2010 Zhang et al. ............... 370/332
2010/0329244 A1* 12/2010 Buckley et al. ............ 370/352

OTHER PUBLICATIONS

"Digital cellular telecommunications system (Phase 2+); Universal mobile telecommunications system (UMTS); LTE; Single radio voice call continuity (SRVCC); Stage 2 (3GPP TS 23.216 version 10.1.0, Release 10)," European Telecommunications Standards Institute Technical Specification, Jun. 1, 2011, 46 pages.
NTT DOCOMO, Inc., "VoLTE voice continuity problem due to SRVCC capability bit setting," 3GPP TSG-RAN2#75, Aug. 22-26, 2011, Athens, Greece, 2 pages.
NTT DOCOMO, Inc., "Aligning SRVCC capability in AS and NAS layer," Change request 10.2.0, RAN2, Dec. 8, 20116 pages.
RAN2, "LS on SRVCC capability bit setting mismatch in AS and NAS," 3GPP TSG-RAN2 Meeting # 75, Aug. 22-26, 2011, Athens, Greece, 2 pages.
Paisal, V., "Seamless voice over LTE," 4th International Conference on Internet Multimedia Services Architecture and Application (IMSAA), Dec. 15, 2010, 5 pages.
Examination Report for European Patent Application No. 11764544.0, mailed Dec. 21, 2016, 5 pages.
Author Unknown, "Technical Specification Group Services and System Aspects; Single Radio Voice Call Continuity (SRVCC); Stage 2 (Release 10)," Technical Specification 23.216, Version 10.1.0, 3GPP Organizational Partners, Jun. 2011, 43 pages.
First Office Action for Chinese Patent Application No. 201180074013.8, dated Jan. 25, 2017, 19 pages.

* cited by examiner

METHOD AND DEVICE FOR INDICATING VOLTE CAPABILITY

This application is a 35 USC 371 national phase application of PCT/EP2011/067273, filed Oct. 4, 2011, the disclosure of which is incorporated herein by reference in its entirety.

TECHNICAL FIELD

The present invention discloses a method and a device which will increase the reliability of voice sessions in LTE systems.

BACKGROUND

Providing a voice session in an LTE system may be done by VoLTE, i.e. voice over LTE, relying on IMS, IP Multimedia Subsystems, using Packet Switched, PS, technology.

Since LTE systems may, at least initially, have limited coverage, a VoLTE session may have to rely on Single Radio Voice Call Continuity, SRVCC, i.e. continuation of the voice session in an available 2G/3G system using Circuit Switched, CS, services when a user, a UE, loses LTE coverage. A VoLTE session is initiated by a UE based on an indication sent from the Network or system, indicating if VoLTE is available or not for the UE.

In certain situation in which VoLTE and/or SRVCC is not available, LTE users may have to rely on so called Circuit Switched Fallback, CSFB for voice service, i.e. the voice session is initiated and carried out using an available 2G/3G system.

SRVCC handover from an LTE system to a 2G/3G system provides functionality for session continuity: when a UE starts to lose LTE coverage during a voice session, it needs to make handover to an available cell in a 2G/3G system. The SRVCC function ensures that the IMS system can route the voice session via a mobile Switching Centre, an MSC, to the 2G/3G system.

Naturally, the LTE system's support for SRVCCC handover to 2G and/or 3G systems needs to match the UE's capability for operation in 2G and/or 3G systems, or SRVCC handover may fail, resulting in the voice session being lost.

In an LTE system, it is the Mobility Management Entity, the MME, which indicates to a UE if a voice session using VoLTE should be initiated, or if the US instead should use CS Fallback for a voice session.

SUMMARY

It is an object of the invention to obtain an increased degree of reliability for voice sessions in LTE systems.

This object is obtained by means of a method for use in a Mobility Management Entity, an MME, in an LTE system. The method comprises obtaining and determining the capability of a mobile terminal in the LTE system regarding the mobile terminal's capability for handover over from the LTE system to a 2G and/or a 3G system, comparing the mobile terminal's said capability and the LTE system's capability for Single Radio Voice Channel Continuity, SRVCC, handover over from the LTE system to a 2G and/or a 3G system, and, depending on the outcome of the comparison, instructing the mobile terminal to use Voice over LTE, VoLTE, or Circuit Switched, CS, fallback when initiating voice sessions.

According to embodiments of the method, the mobile terminal is instructed to use VoLTE or CS fallback when initiating voice sessions by means of using the indication "IMS voice over PS session indicator" for indicating that IP Multimedia Subsystem voice over Packet Switched, PS, sessions, is supported. This indication is included in the Information Element called "EPS network feature support" in the NAS, Non Access Stratum, protocol.

According to embodiments of the method, the mobile terminal's capability for Single Radio Voice Call Continuity, SRVCC, handover over from the LTE system to a 2G and/or a 3G system, is obtained and determined by means of the Feature Group Indicator, FGI, bits sent by the mobile terminal to the MME, in the IE UE Radio Capability According to embodiments of the method, the mobile terminal's capability for Single Radio Voice Call Continuity, SRVCC, handover over from the LTE system to a 2G and/or a 3G system, is obtained and determined by means of an Information Element, IE, which is sent to the MME from the mobile terminal.

According to embodiments of the method, the IE is included in the message Attach Request from the mobile terminal. According to some such embodiments, the IE is created by and sent from the mobile terminal's eNodeB.

The invention also discloses a Mobility Management Entity, an MME, for an LTE system. The MME is arranged to obtain and determine the capability of a mobile terminal in the LTE system regarding the mobile terminal's capability for handover over from the LTE system to a 2G and/or a 3G system, and to compare the mobile terminal's said capability and the LTE system's capability for Single Radio Voice Channel Continuity, SRVCC, handover from the LTE system to a 2G and/or a 3G system, and to use the outcome of the comparison, to instruct the mobile terminal to use Voice over LTE, VoLTE, or Circuit Switched, CS, fallback when initiating voice sessions.

In embodiments, the MME is arranged to obtain and determine said capability of the mobile terminal by means of an Information Element, an IE, sent from the mobile terminal's eNodeB.

In embodiments, the MME is arranged to obtain and determine said capability of the mobile terminal by means of an indication sent from the mobile terminal's eNodeB that the mobile terminal should be instructed to use Voice over LTE, VoLTE, when initiating voice sessions.

In embodiments, the MME is arranged to obtain and determine said capability of the mobile terminal by means of the Feature Group Indicator, FGI, bits sent by the mobile terminal to the MME, in the Information Element UE Radio Capability.

In embodiments, the MME is arranged to include an indication to the MME via the mobile terminal's eNodeB in the message Attach Request, said indication indicating if the mobile terminal is capable of handover from the LTE system to a 2G and/or a 3G system. In some such embodiments, the MME is arranged to use two bits as said indication, the two bits being set to the same values as the Feature Group Indicator bits sent by the mobile terminal to the mobile terminal's MME, in the Information Element UE Radio Capability.

There is also disclosed a mobile terminal for an LTE system. The mobile terminal is arranged to include an indication to the MME via the mobile terminal's eNodeB in the message Attach Request, the indication indicating if the mobile terminal is capable of handover from the LTE system to a 2G and/or a 3G system.

In embodiments, the mobile terminal is arranged to use two bits as said indication, the two bits being set to the same values as the Feature Group Indicator bits sent by the mobile terminal to the mobile terminal's MME, in the Information Element UE Radio Capability.

BRIEF DESCRIPTION OF THE DRAWINGS

The invention will be described in more detail in the following, with reference to the appended drawings, in which.

DETAILED DESCRIPTION

Figure 1:
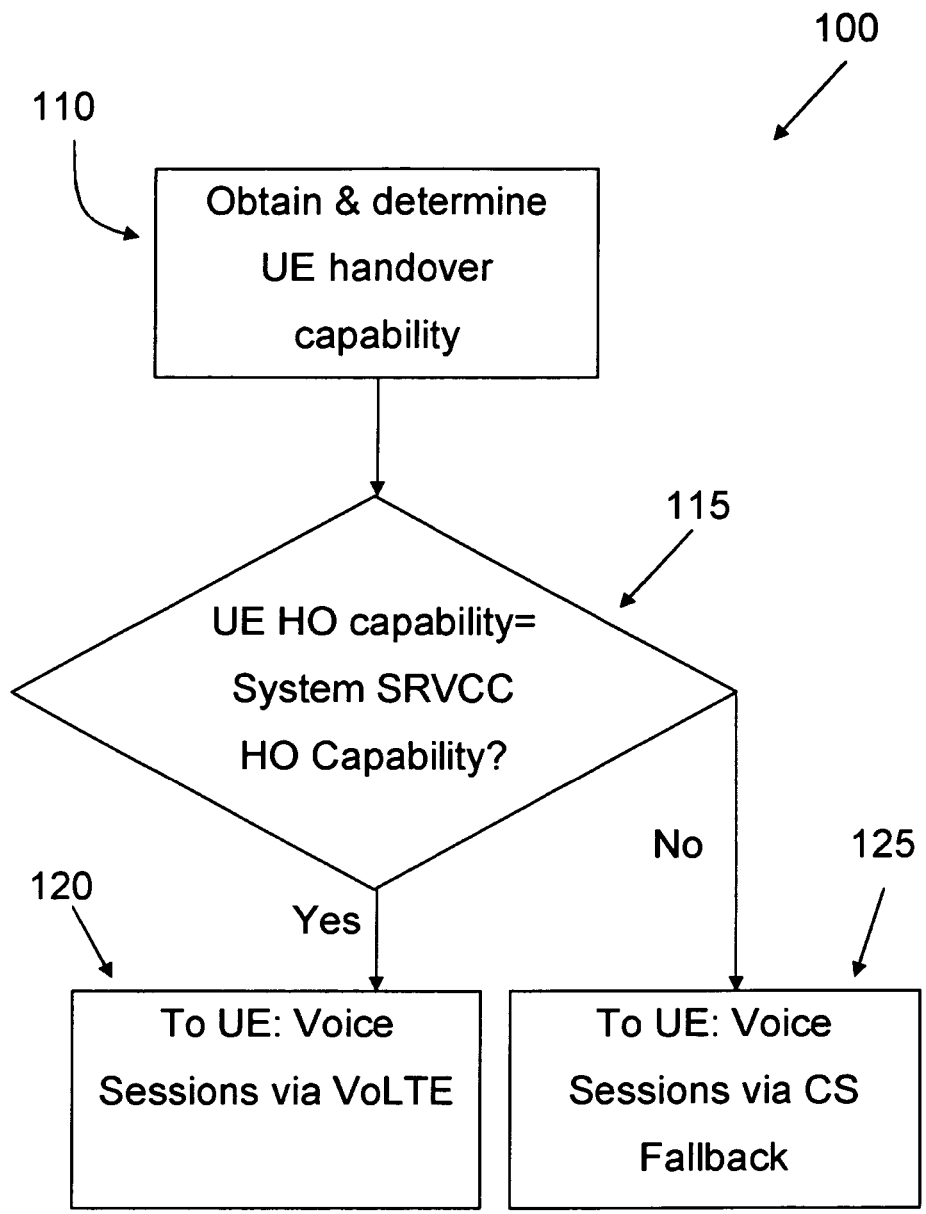
FIG. 1 shows a flow chart of a method.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic flowchart of a method 100 of the invention. The steps will first be described briefly below, following which a more detailed description of each step will be given. The term UE, User Equipment, will be used as an alternative to the term "mobile terminal".

The method 100 is a method for use in a Mobility Management Entity, an MME, in an LTE system, and comprises, as shown in step 110, obtaining and determining a UE's capability for handover from the LTE system to a system of the 2G and/or 3G kind.

The UE's capability for handover ("HO") to other systems is then compared, step 115, to the capabilities of the system, i.e. the LTE system, regarding so called SRVCC handover, Single Radio Voice Call Continuity.

If the UE's handover capabilities match (i.e. are compatible with) those of the system's SRVCC handover capabilities, the MME then instructs the UE to use Voice over LTE, VoLTE, for voice sessions, and if not, the MME instructs the UE to use Circuit Switched (CS) fallback, i.e. 2G or 3G, for voice sessions.

A more detailed description of Step 110, Obtain & determine UE handover capability is as follows: In one embodiment of the method 100, here referred to as Alternative 1, the UE's handover capability is obtained by means of the FGI (Feature Group Indicator) bits included by the UE to the UE's eNodeB in the IE UE Radio Capability. The eNodeB then includes information obtained from FGI bits 9 and 27 in an IE (Information Element) to the MME, where the IE is one which the MME is adapted to read and understand. As an example, FGI bit 9 set to "1" may indicate UE handover capability to 2G systems, and FGI bit 27 set to "1" may indicate UE handover capability to 3G systems. In a version of Alternative 1, the eNodeB simply sends a message to the MME indicating UE capability of handover to 2G and/or 3G systems. In another version of Alternative 1, the eNodeB may carry out the comparison between UE and MME capabilities, and sends an indication to the MME indicating if UE and NW SRVCC handover to 2G and/or 3G systems match or not.

In another embodiment of the method 100, here referred to as Alternative 2, the MME is adapted to read and understand the FGI bits sent by the UE to the MME via the eNodeB in the IE UE Radio Capability.

A procedural sequence using alternative 1 or 2 is shown below, which also comprises references to steps in the flowchart of FIG. 1:

1. UE sends Attach Request.
2. MME sends Attach Accept (MME includes in the Attach Accept sent to the UE the IMS voice over PS session is supported indication set without taking into account any mismatch between UE and MME capabilities for handover/SRVCC
3. The UE is now attached.
4. The UE's eNodeB requests the IE UE Radio Capability from the UE.
5. The UE's eNodeB sends the IE UE Radio Capability from the UE to the MME.

In step 110 of the embodiment referred to above as Alternative 1 above, the eNodeB also includes the UE's handover capabilities to 2G and/or 3G systems (corresponding to FGI bits 9 and/or 27) information in an IE (on S1) which is readable to the MME. As noted above, in a version of this embodiment, the eNodeB indicates "SRVCC possible" by comparing the capabilities of the UE and the MME.

6. According to step 115 of the method 100, the MME checks the UE's handover capabilities, and in the case of a "mismatch" with the MME's capabilities, changes the IMS voice over PS session is supported indication to "No". (The YES case of step 115 actually corresponds to no change here, see step 2 of this procedural sequence.)

According to step 115 of the embodiment referred to as Alternative 1 above, the MME here uses the IE added by the eNodeB which corresponds to FGI bits 9 and 27.

According to step 115 of the embodiment referred to as Alternative 2 above, the MME here uses the existing information on UE radio Capabilities sent by the eNodeB (i.e. MME needs to be able to read and understand the IE "UE Radio Capability".)

7. In the next TAU Accept, the UE sends IMS voice over PS session is supported indication to UE.

Using Alternative 1 or 2, there may be a time interval between the Attach and the TAU when the IMS voice over PS session is supported indication will be wrong. In order to minimize this time period, it is possible for the MME to trigger a TAU from the UE by the GUTI Reallocation procedure. The MME could generate GUTI reallocation with non-broadcasted TAI to trigger a TAU from the UE so a correct PS voice indicator is set in the UE, i.e. the MME sends GUTI Reallocation Command (GUTI, TAI list) to the UE with a TAI list not including the TAI of the actual cell where the UE is. According to 24.301, section 5.5.3.2.2:

The UE in state EMM-REGISTERED shall initiate the tracking area updating procedure by sending a TRACKING AREA UPDATE REQUEST message to the MME, a) when the UE detects entering a tracking area that is not in the list of tracking areas that the UE previously registered in the MME.

An alternative procedural sequence is as follows:

1. UE sends Attach Request and includes 2 bits in the NAS Attach Request, analogous to the FGI bits, as part of step 110 of the method 100.
2. The MME uses the 2 bits to check if there is a mismatch between UEs handover capabilities and the MME's SRVCC capabilities, and concludes if the UE shall use IMS voice or not, as part of step 115 of the method 100.

3. The MME includes in the Attach Accept sent to the UE the IMS voice over PS session is supported indication set to the appropriate value, i.e. Yes/No.

4. The UE is now attached and knows correctly if it should use IMS voice (i.e. VoLTE) or not. The two NAS bits could e.g. be included in the UE network capability IE in the Attach Request.

The two new NAS bits could e.g. be included in the UE network capability IE in the Attach Request, and added to the definition in 3GPP TS 24.301:

| SRVCC 2G capability (octet 8, bit 1) | |
|---|---|
| 0 | SRVCC from E-UTRAN to 2G not supported |
| 1 | SRVCC from E-UTRAN to 2G supported |
| SRVCC 3G capability (octet 8, bit 2) | |
| 0 | SRVCC from E-UTRAN to 3G not supported |
| 1 | SRVCC from E-UTRAN to 3G supported |

Figure 2:
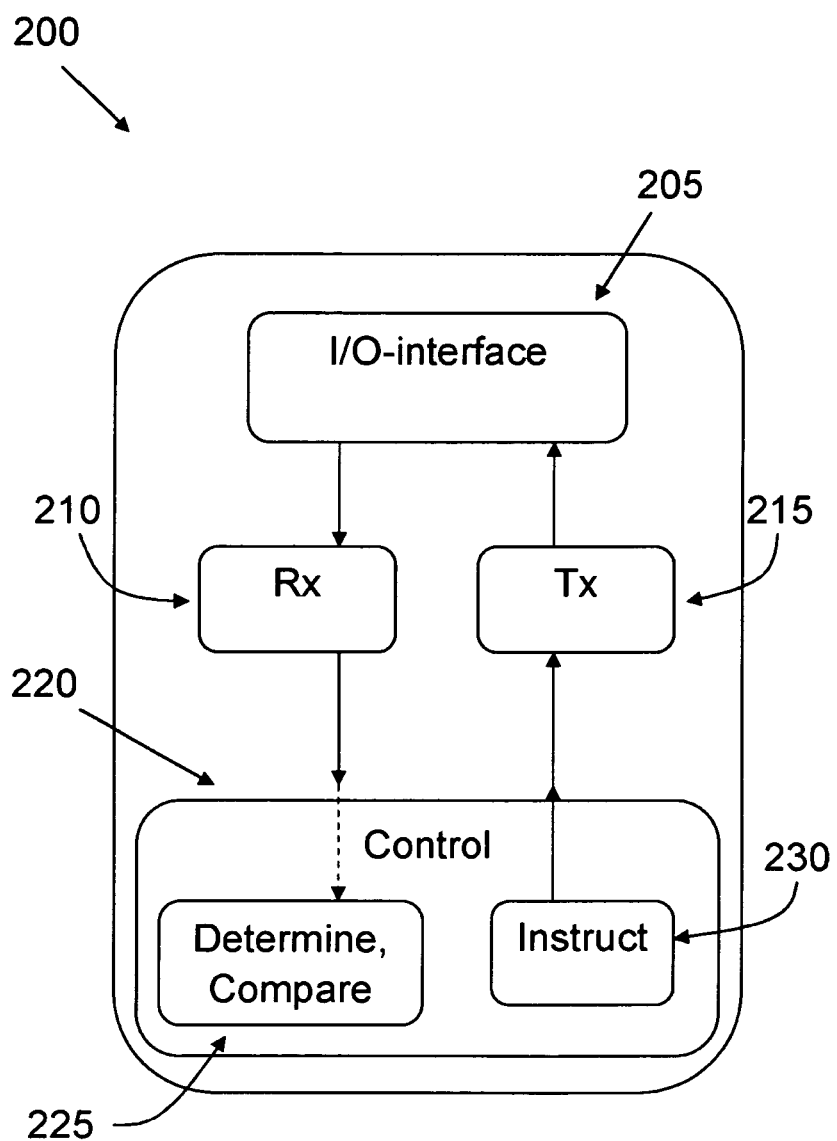
FIG. 2 shows a block diagram of a Mobility Management Entity.

FIG. 2 shows a block diagram of a Mobility Management Entity, an MME, 200 for an LTE system. The MME 200 comprises an I/O-unit 205 for interfacing with other units in the LTE system, such as one or more eNodeBs, and also comprises a Receiver Unit 210 and a Transmitter Unit 215 for receiving and transmitting, respectively, traffic from other nodes in the LTE system By means of the I/O-interface 205 and the Receiver Unit 210, the MME obtains information on the capability of a mobile terminal in the LTE system regarding the mobile terminal's capability for handover over from the LTE system to a 2G and/or a 3G system.

The MME 200 also comprises a Control Unit 220 for controlling the operation of the MME 200. As shown in FIG. 2, the Control Unit 220 comprises a unit 225 for determining the capability of a mobile terminal in the LTE system regarding the mobile terminal's capability for handover over from the LTE system to a 2G and/or a 3G system, which is done using the information obtained via the Receiver Unit 210. The unit 225 also serves to compare the mobile terminal's said capability and the LTE system's capability for Single Radio Voice Channel Continuity, SRVCC, handover from the LTE system to a 2G and/or a 3G system.

The outcome of the comparison is fed to an Instruction Unit 230, which uses this outcome to prepare instructions to the mobile terminal to use Voice over LTE, VoLTE, or Circuit Switched, CS, fallback when initiating voice sessions. The instructions are sent to the mobile terminal via the mobile terminal's eNodeB from the Transmitter Unit 215 and the I/O-interface 205, The instructions to the mobile terminal are to use VoLTE when initiating voice sessions if the comparison is a "match", and to use CS Fallback when initiating voice sessions if the comparison is a "mismatch".

Naturally, in other embodiments of the MME 200, the functions performed by the units shown in FIG. 2 can be structured in different manners while still performing the same functions. For example, the unit 225 and/or the unit 230 can be "stand alone" units which are not part of the Control Unit 220.

In embodiments, the MME 200 is arranged to obtain and determine said capability of the mobile terminal by means of an Information Element, an IE, sent from the mobile terminal's eNodeB.

In embodiments, the MME 200 is arranged to obtain and determine said capability of the mobile terminal by means of an indication sent from the mobile terminal's eNodeB that the mobile terminal should be instructed to use Voice over LTE, VoLTE, when initiating voice sessions.

In embodiments, the MME 200 is arranged to obtain and determine said capability of the mobile terminal by means of the Feature Group Indicator, FGI, bits sent by the mobile terminal to the MME, in the Information Element UE Radio Capability.

Figure 3:
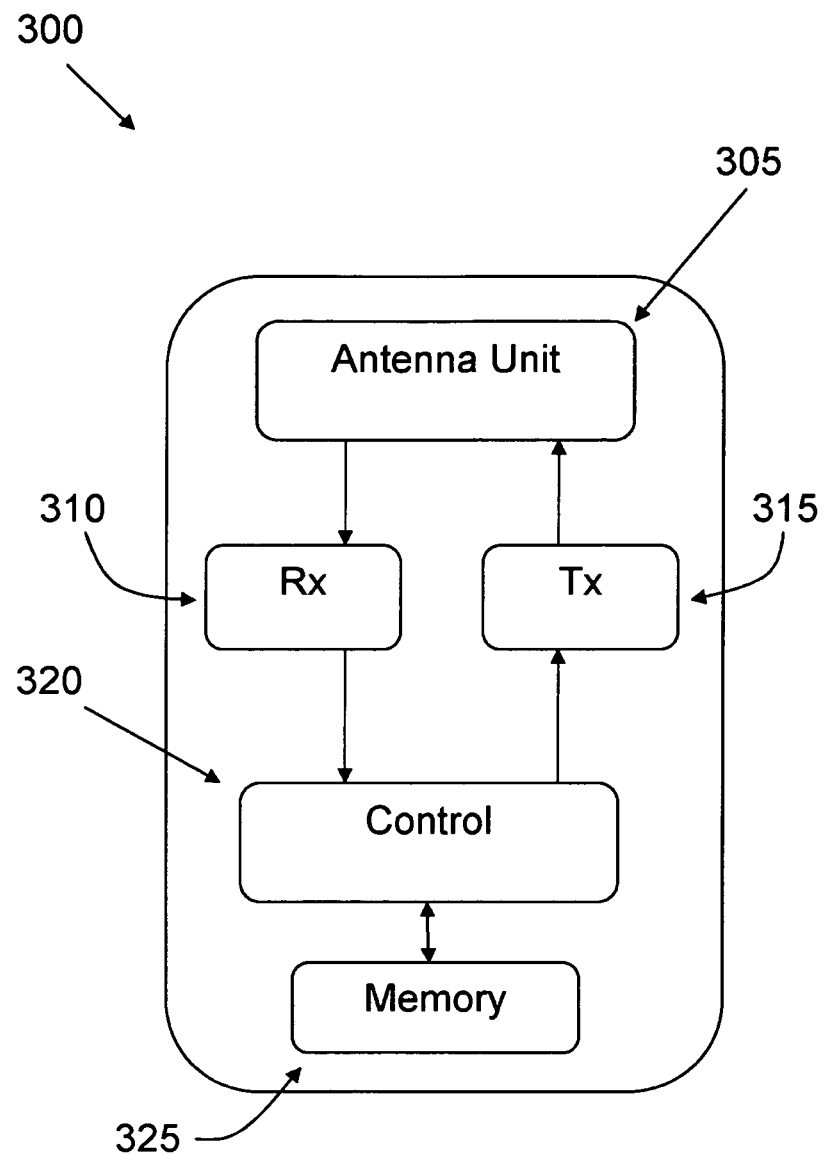
FIG. 3 shows a block diagram of a Mobile Terminal.

FIG. 3 shows a schematic block diagram of a mobile terminal 300 for an LTE system. The mobile terminal 300 comprises an antenna unit 305, as well as a Receiver Unit 310 and a Transmitter Unit 315.

The operation of the mobile terminal 300 is carried out by means of a Control Unit 320, with the aid of a Memory Unit 315.

It is the Control Unit 320 which includes an indication in the message Attach Request, the indication indicating if the mobile terminal is capable of handover from the LTE system to a 2G and/or a 3G system. This information can, for example, be stored in the Memory Unit 325 where it can be accessed by the Control Unit when necessary. The message Attach Request is then transmitted to the MME via the eNodeB by means of the Transmit Unit 315 and the Antenna Unit 305.

In embodiments, the Control Unit 320 uses two bits as said indication, the two bits being set to the same values as the Feature Group Indicator bits which are sent by the mobile terminal 300 to the mobile terminal's MME in the Information Element UE Radio Capability.

Abbreviations in this Text

2G $2^{nd}$ Generation
3G $3^{rd}$ Generation
AS Access Stratum
ASN.1 Abstract Syntax Notation One
CS Circuit Switched
CSFB CS Fall Back
ECM EPS Connection Management
EMM EPS Mobility Management
eNB evolved Node B
EPS Evolved Packet System
EUTRAN Evolved Universal Terrestrial Radio Access Network
FGI Feature Group Indicator
GERAN GSM EDGE Radio Access Network
GUTI Globally Unique Terminal Identifier
HO Handover
HPLMN Home PLMN
IE Information Element
IMS IP Multimedia Subsystem
ISR IDLE Mode Signaling Reduction
LTE Long Term Evolution
MME Mobile Management Entity
MSC Mobile Switching Centre
NAS Non Access Stratum
NW Network
PLMN Public Land Mobile Network
PS Packet Switched
RAT Radio Access Technology
SRVCC Single Radio Voice Call Continuity
TAI Tracking Area Identifier
TAU Tracking Area Update
TS Technical Specification
UE User Equipment
UMTS Universal Mobile Telecommunications System
UTRA UMTS Terrestrial Radio Access
UTRAN UMTS Terrestrial Radio Access Network
VoLTE Voice over LTE Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A method for use in a Mobility Management Entity, an MME, in an LTE system, the method comprising obtaining and determining the capability of a mobile terminal in the LTE system regarding the mobile terminal's capability for Single Radio Voice Channel Continuity, SRVCC, handover from the LTE system to a 2G and/or a 3G system, comparing the mobile terminal's said capability and the LTE system's capability for Single Radio Voice Channel Continuity, SRVCC, handover over from the LTE system to a 2G and/or a 3G system, and, depending on the outcome of the comparison, instructing the mobile terminal to use Voice over LTE, VoLTE, or Circuit Switched, CS, fallback when initiating voice sessions, where the mobile terminal is instructed to use VoLTE if both the mobile terminal and the LTE system are capable of SRVCC handover and the mobile terminal is instructed to use CS fallback otherwise.

2. The method of claim 1, according to which the mobile terminal is instructed to use Voice over LTE, VoLTE, or Circuit Switched, CS, fallback for voice sessions by means of using the indication "IMS voice over PS session indicator" for indicating that IP Multimedia Subsystem voice over Packet Switched, PS, session is supported.

3. The method of claim 1, according to which the mobile terminal's capability for Single Radio Voice Call Continuity, SRVCC, handover over from the LTE system to a 2G and/or a 3G system, is obtained and determined by means of the Feature Group Indicator, FGI, bits sent by the mobile terminal to the MME, in the Information Element UE Radio Capability.

4. The method of claim 1, according to which the mobile terminal's capability for Single Radio Voice Call Continuity, SRVCC, handover over from the LTE system to a 2G and/or a 3G system, is obtained and determined by means of an Information Element, IE, which is sent to the MME from the mobile terminal's eNodeB.

5. The method of claim 4, according to which the IE is included in the message Attach Request from the mobile terminal.

6. The method of claim 4, according to which the IE is created by and sent from the mobile terminal's eNodeB.

7. A Mobility Management Entity, an MME, for an LTE system, comprising:
a processor; and
a memory containing instructions executable by the processor whereby the MME is configured to:
obtain and determine the capability of a mobile terminal in the LTE system regarding the mobile terminal's capability for Single Radio Voice Channel Continuity, SRVCC, handover over from the LTE system to a 2G and/or a 3G system;
compare the mobile terminal's said capability and the LTE system's capability for Single Radio Voice Channel Continuity, SRVCC, handover from the LTE system to a 2G and/or a 3G system; and
use the outcome of the comparison, to instruct the mobile terminal to use Voice over LTE, VoLTE, or Circuit Switched, CS, fallback when initiating voice sessions, where the mobile terminal is instructed to use VoLTE if both the mobile terminal and the LTE system are capable of SRVCC handover and the mobile terminal is instructed to use CS fallback otherwise.

8. The MME of claim 7, further configured to obtain and determine said capability of the mobile terminal by an Information Element, an IE, sent from the mobile terminal's eNodeB.

9. The MME of claim 7, further configured to obtain and determine said capability of the mobile terminal by an indication sent from the mobile terminal's eNodeB that the mobile terminal should be instructed to use Voice over LTE, VoLTE, when initiating voice sessions.

10. The MME of claim 7, further configured to obtain and determine said capability of the mobile terminal by the Feature Group Indicator, FGI, bits sent by the mobile terminal to the MME, in the Information Element UE Radio Capability.

11. The method of claim 2, according to which the mobile terminal is instructed to use Voice over LTE, VoLTE, or Circuit Switched, CS, fallback for voice sessions by means of using the indication "IMS voice over PS session indicator" for indicating that IP Multimedia Subsystem voice over Packet Switched, PS, session is supported.

12. The method of claim 2, according to which the mobile terminal's capability for Single Radio Voice Call Continuity, SRVCC, handover over from the LTE system to a 2G and/or a 3G system, is obtained and determined by means of an Information Element, IE, which is sent to the MME from the mobile terminal's eNodeB.

* * * * *

UNITED STATES PATENT AND TRADEMARK OFFICE
CERTIFICATE OF CORRECTION

PATENT NO. : 9,723,030 B2
APPLICATION NO. : 13/263829
DATED : August 1, 2017
INVENTOR(S) : Hedman et al.

It is certified that error appears in the above-identified patent and that said Letters Patent is hereby corrected as shown below:

On the Title Page

In Item (56), under "U.S. PATENT DOCUMENTS", in Column 2, Line 1, delete "Mukherjee" and insert -- Mukherjee et al. --, therefor.

In Item (57), under "ABSTRACT", in Column 2, Line 7, delete "Channel" and insert -- Call --, therefor.

On Page 2, in Item (56), under "OTHER PUBLICATIONS", in Column 1, Line 10, delete "20116" and insert -- 2011, 6 --, therefor.

On Page 2, in Item (56), under "OTHER PUBLICATIONS", in Column 1, Line 24, delete "dated" and insert -- mailed --, therefor.

In the Specification

In Column 1, Line 40, delete "SRVCCC" and insert -- SRVCC --, therefor.

In Column 1, Line 60, delete "Channel" and insert -- Call --, therefor.

In Column 2, Line 30, delete "Channel" and insert -- Call --, therefor.

In Column 4, Line 30, delete "step 2" and insert -- alternative 2 --, therefor.

In Column 5, Line 41, delete "Channel" and insert -- Call --, therefor.

In Column 5, Line 49, delete "205," and insert -- 205. --, therefor.

In Column 6, Lines 11-12, delete "Memory Unit 315." and insert -- Memory Unit 325. --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*

In Column 6, Line 45, delete "Terminal" and insert -- Temporary --, therefor.

In Column 6, Line 52, delete "Mobile" and insert -- Mobility --, therefor.

In the Claims

In Column 7, Line 51, in Claim 1, delete "Channel" and insert -- Call --, therefor.

In Column 7, Line 54, in Claim 1, delete "Channel" and insert -- Call --, therefor.

In Column 8, Line 26, in Claim 7, delete "Channel" and insert -- Call --, therefor.

In Column 8, Line 31, in Claim 7, delete "Channel" and insert -- Call --, therefor.